United States Patent [19]

Rios et al.

[11] 4,215,151

[45] Jul. 29, 1980

[54] PROCESS FOR ROASTING AN AGRO-FOOD PRODUCT IN A FLUIDIZED BED OF INERT PARTICLES

[75] Inventors: Gilbert M. Rios, Mauguio; Henri Gibert; Jean Crouzet, both of Montpellier; Jean-Claude Vincent, Saint-Clemént la-Riviére, all of France

[73] Assignee: Agence Nationale de Valorisation de la Recherche (ANVAR), Neuilly-sur-Seine, France

[21] Appl. No.: 905,014

[22] Filed: May 11, 1978

[30] Foreign Application Priority Data

May 11, 1977 [FR] France .................. 77 15007

[51] Int. Cl.² .................. A23F 1/02; F26B 3/08; F26B 3/10
[52] U.S. Cl. .................. 426/467; 34/10; 209/28; 209/44; 209/474; 432/15; 432/16; 432/58
[58] Field of Search .................. 426/465, 467; 432/14, 432/15, 16, 58, 215; 34/9, 10, 34, 57 A; 23/284; 209/28, 29, 44, 474; 422/145

[56] References Cited

U.S. PATENT DOCUMENTS

| 1,973,836 | 11/1930 | Woodhead et al. ............ 209/29 |
| 3,035,918 | 5/1962 | Sorgenti et al. ............ 426/467 X |
| 3,117,064 | 1/1964 | Friedrich ............ 432/15 |
| 3,122,439 | 2/1964 | MacAllister et al. ............ 426/467 |
| 3,821,342 | 6/1974 | Hurd ............ 432/15 |
| 3,821,450 | 6/1974 | Stauber ............ 426/467 |
| 3,866,332 | 2/1975 | Hertz ............ 209/474 |
| 4,126,945 | 11/1978 | Manser et al. ............ 34/10 |

FOREIGN PATENT DOCUMENTS

| 629348 | 2/1964 | Canada ............ 426/467 |
| 2226207 | 5/1976 | France . | |

Primary Examiner—S. Leon Bashore
Assistant Examiner—Steve Alvo
Attorney, Agent, or Firm—Shlesinger, Arkwright, Garvey and Dinsmore

[57] ABSTRACT

The invention concerns a process and a device for roasting an agro-food product in the form of grains.

The process consists of fluidizing an auxiliary body in the form of fine solid particles in an enclosure 1, and putting the grains of the product to be roasted in flotation in the fluidized bed of particles of which the temperature is adapted to roasting, to generate the roasting by the effect of the shocks of the fine particles of the auxiliary body with the grains of the product.

The invention can be applied particularly for the roasting of grains of a product such as coffee, cocoa, etc.

10 Claims, 2 Drawing Figures

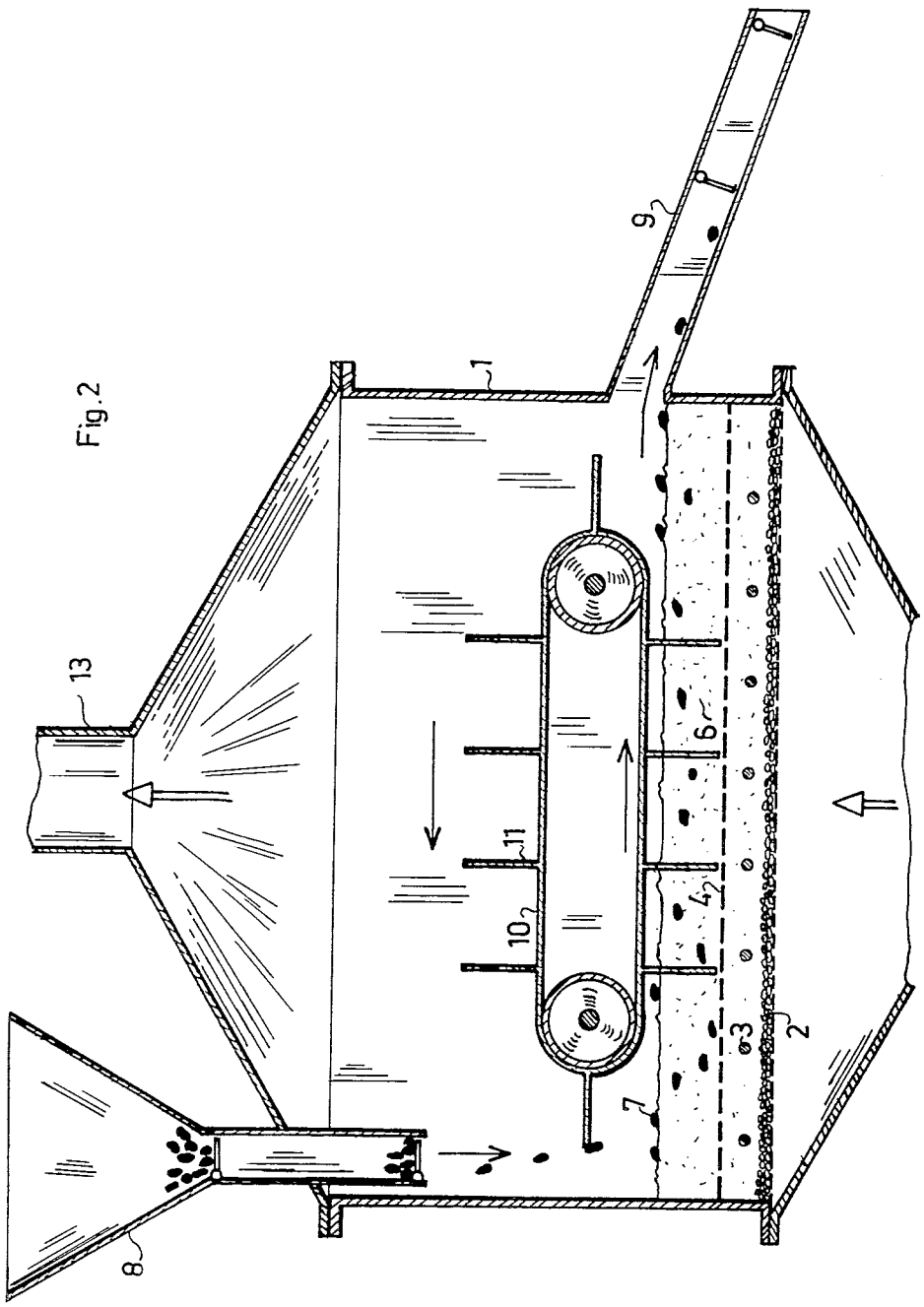

PROCESS FOR ROASTING AN AGRO-FOOD PRODUCT IN A FLUIDIZED BED OF INERT PARTICLES

The invention concerns a process and a device for torrefaction or roasting of an agro-food product which is presented in the form of grains, particularly coffee, cocoa, or the like.

BACKGROUND OF THE INVENTION

It is known that the object of roasting an agro-food product is either to destroy certain harmful features of the product or to cause formation of certain flavor features, with drying of the product.

Traditional roasting processes consist either of directly attacking either the grains or a metallic enclosure which contains the grains with a flame, or else passing a current of preheated gas into this enclosure. In both cases, the grains are mechanically stirred to improve the uniformity of treatment or to favor the contact between phases. At any rate, in the direct flame attack process, the treatment of the grains is not homogenous. With coffee for example, the calcinated aromatic oils appear at the surface of the grains which then cannot be preserved: the structure of the grain is made very fragile and numerous breaks are produced during the treatment. It is also established that the desquamation or peeling of some grains occurs when the grains enter too rapidly into contact with the heated wall of the enclosure. In the other aforementioned process, the heat yield is very mediocre because the exchange between the gas and the grains is not good, and this type of treatment leads to great consumption of energy.

In a recent attempt to improve the heat exchanges between the gas and the grains in this process, the grains have been put in suspension or "fluidized" in the current of hot gas: this technique assures excellent irrigation of the fluidized bed by the hot gas and obtains an intense stirring of the grains without necessitating mechanical agitation. Large dimension grains, for example coffee grains of which the dimensions are on the order of 5 to 8 millimeters to be fluidized, require that the gas circulate at high speeds, greater than the minimum fluidization velocity which is on the order of 1.2 m/s for green coffee grains. This causes several inconveniences. In the first place, the flows of larger passage necessitate provision of accessory installations for gas circulation, which are costly and cumbersome. Also, the cross section of the enclosure in which the torrefaction or roasting is to be effected must remain relatively small so as not to require excessive gas flows, which is not compatible with practical operation. Consequently, the time unit yields of products treated by fluidization are low. And the correct control of the roasting time imposes a discontinuous progress of the treatment, charge by charge. The discontinuous function makes the process for difficult to automate and increases the personnel necessary; it also leads to heat losses during the starting phases.

Whatever the quality of the contact between the gaseous phase and the solid phase, the coefficient of thermal transfer between a gas and a solid is always moderate, which limits the possibilities of exchanges between the two phases, and does not permit satisfactory use of the heat potential of the gas.

The present invention proposes a remedy of the aforementioned inconveniences with a new roasting process which will permit uniform roasting of the grains in remarkably economical conditions, particularly concerning energy usage.

One object of the invention is to permit continuous treatment.

Another object is to reduce the cost and cumbersomeness of the necessary installations.

SUMMARY OF THE INVENTION

The process according to the invention is applied when the grains of the agro-food product are of such a nature that they will swell and will lose weight in the course of a thermal treatment. This is most often met with products such as coffee, cocoa, grape pips . . . . The following is the process according to the invention:

placing an auxiliary chemically inert body in suspension in an enclosure, which body has the form of fine particles, by means of a carrier gas current moving at a speed greater than the minimum fluidization speed of said particles, so as to form a thin fluidized layer or bed of which the thickness is at the most approximately equal to 30 times the mean granulometry of the grains of the product to be treated, and of which the apparent mid-volume mass is approximately between 1.2 and 4 times the initial volume mass of the grain of said product to be treated, bringing said fluidized bed to a suitable temperature to assure roasting of the product to be treated, introducing the grains of the product to be treated into said fluidized bed to put each grain into suspension in this bed and to bring it the quantity of heat necessary for its roasting by the bias of multiple shocks of the fine particles on the grain, removing the treated grains by overflow at the top of the fluidized bed.

The necessary heat application can be realized by direct application in the heart of the fluidized bed or at its periphery: it can also be realized by heating of the carrier gas current at its inlet into the enclosure. Preferably, the carrier gas is recycled, at least partially, after passage through the enclosure.

The heat capacity and the inertia of the fluidized bed are far higher than those of a gas, which allows the center of the fluidized bed to attain a uniform temperature which favors uniformity of roasting.

Moreover, the particles of the auxiliary body used in the process have a very small granulometry, so that their fluidization requires only reduced gas velocities.

Their granulometry is smaller than that of the body to be treated and, in practice, is as small as possible and at the most equal to approximately 1/5 the granulometry of the body to be treated. Thus, each grain can be assimilated on a wall by the particles and the exchange which is produced by shock effects of the fine particles on each grain is a fluid bed/wall exchange, of which it is known that the coefficient of transfer is high in comparison with a gas/solid exchange. For example, for coffee or cocoa grains, the transfer coefficient of heat by convection between the air and the grains presents a maximum value on the order of 50 to 60 kilocalories per hour, per $m^2$ and per degree celsius: this coefficient is approximately 5 times greater for a heat exchange between grains and a heterogenous bed of fine solid particles.

In the process of the invention, the fine particles of the auxiliary body thus fill a double function: to assure mechanical suspension of the grains of the product to be roasted in the gaseous current without necessitating utilization of high speeds of gas, and to realize a uniform and efficient treatment of each grain, by the bias of the natural multiple shocks of the fine particles of the fluidized bed.

The fluidized bed of auxiliary bodies assures a good mixture of the fine particles and the grains to be treated at the beginning and through the course of the roasting, which is very propicious for the transfer of heat from the particles towards the grains. After swelling of the grains and loss of weight, they are floated to the surface without mixing and can be removed by overflow or discharge outlet.

In these conditions, the process according to the invention can be advantageously used continuously in an elongated enclosure; the product to be roasted is poured continuously into the enclosure at a predetermined flow, drawn continuously to the interior of the enclosure from the feed zone toward a removal zone, and removed continuously from the removal zone by overflow.

If space is available, the product is then submitted to a separation operation, to separate those particles of the auxiliary body which may be carried along with the grains of the treated product.

It is known that the roasting of an agro-food product is generally followed by a rapid cooling operation or hardening or tempering of the grains: this operation can be coupled with the separation operation. In a first method, the products are caused upon their discharge from the enclosure to circulate on a screen which has mesh dimension intermediate between that of the fine particles and that of the grains of the product, and this screen is vibrated and has a cold gas current passing through it upward. In another method, the products are set in fluidization in a current of cold gas in such a manner as to separate by the effect of the shocks separating the fine particles from the grains and pneumatic drawing force on the grains: this fluidization can be realized according to the technology described in French Pat. No. 2,371,227.

The carrier gas used is generally air; in some roasting it is advantageous to use an inert gas, for example nitrogen in order to avoid oxidation of the product.

The invention also extends to a roasting device for grains of an agro-food product, as in the process described above. This devices includes a roasting enclosure, an inlet conduit for the carrier gas opening at the base of the enclosure, a discharge conduit for the gas at the top of the enclosure and a fluidization distributor situated at the base of the enclosure. In the present invention, the device includes a thin bed of fine particles of a chemically inert auxiliary body arranged over the distributor in order to be fluidized by the carrier gas and heating means of the bed: for continuous function, the enclosure is of elongated form and the device has feed means for the grains of the product to be treated, adapted to discharge a predetermined flow of grains in one zone of the enclosure, means for removal of the grains adapted to generate a circulation of the grains of the feed zone toward the removal zone.

The means for drawing the grains can be mechanical; they can also be realized by a suitable positioning of the device in relation to the vertical in order to cause a gravity movement of the grains from the feed zone toward the removal zone.

DESCRIPTION OF THE DRAWINGS

Other characteristics, objects and advantages of the invention will appear in the following description, in reference to the attached drawings, which show one embodiment as nonlimiting example.

FIG. 2 is a partial cross section in a vertical plane.

DESCRIPTION OF THE INVENTION

Figure 1:
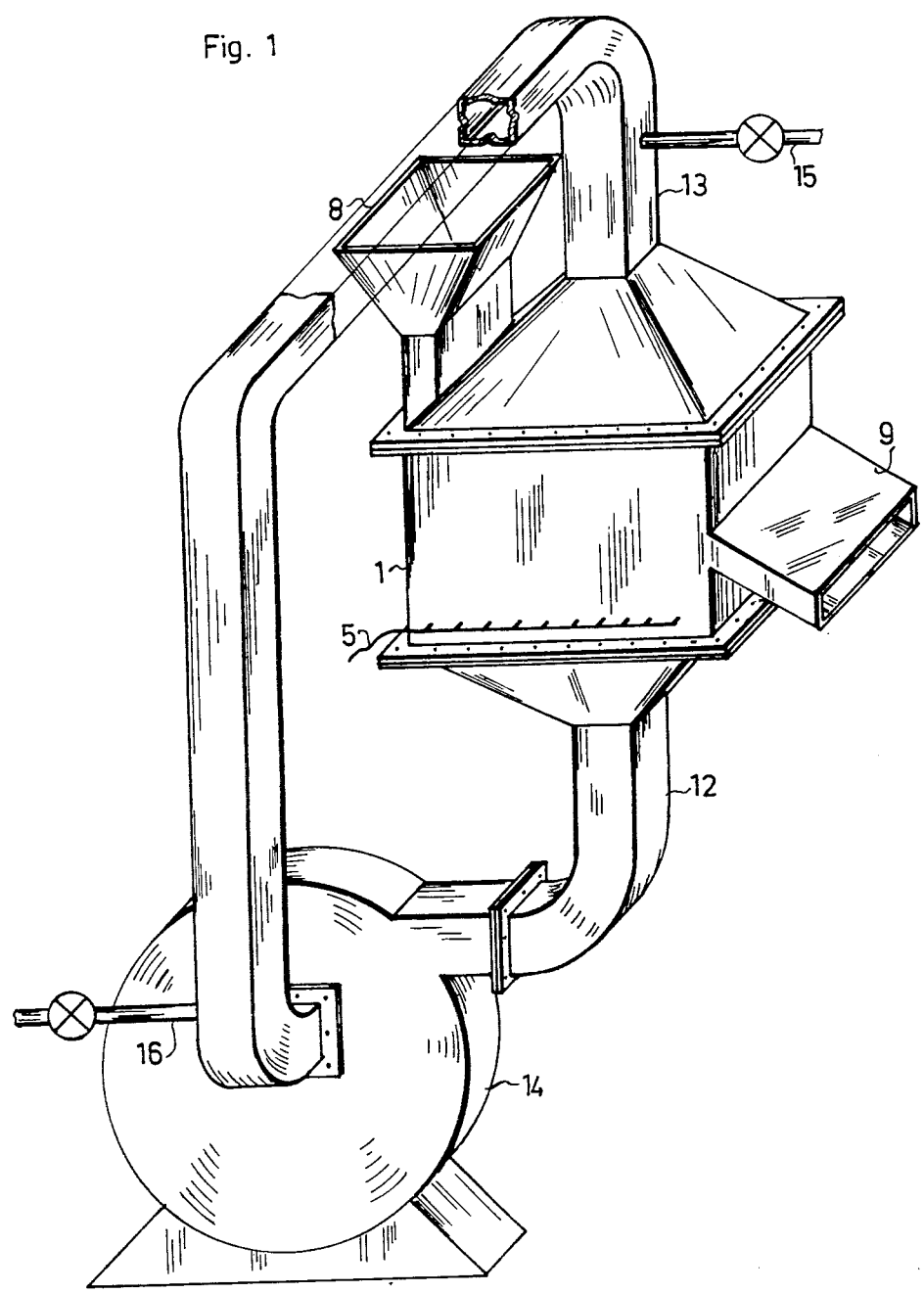
FIG. 1 is a diagram of the assembly of a roasting device according to the invention.

The roasting device shown as example in the drawings includes a treatment enclosure 1 of elongated rectangular section, of which the length is equal to several times the width.

At its base this enclosure has a fluidization distributor 2 which can be of the type described in French Pat. No. 2,226,207.

Above this distributor is placed a heat exchange constituted of electric heating elements such as 3 surmounted by a protective grill 4. Elements 3 are connected on the exterior of the enclosure to a current source, through electric conductors 5.

Above the distributor, the enclosure contains a bed of fine inert particles 6, fluidized by an air current. These particles can comprise for example glass balls of diameter on the order of 250 microns. The quantity of particles provided is such that the fluidized bed has a height on the order of several centimeters and a volume mass on the order of 1.3 gr/cm$^3$ for coffee roasting.

Protective grill 4 has meshes of dimensions adapted to allow fine particles 6 to pass freely through and to prevent the passage of grains of the product to be treated, for example coffee grains 7.

These grains can be introduced continuously into the enclosure by means of a hopper 8 which has two movable blocking flaps to constitute an inlet screen. This hopper empties on one side of the enclosure in the vicinity of one of its side walls.

On the opposite side, the enclosure is provided with a removal conduit 9 which is flush with the top of the fluidized bed to collect the treated coffee grains by overflow. This conduit is also provided with two movable blocking flaps forming a discharge screen.

Also, enclosure 1 is provided with means for drawing the grains through, which draws them slowly from the feed zone to the removal zone. These means are adapted such that the time spent by a grain in the enclosure is equal to the necessary length of time for treatment.

In the example, these movement means include an endless support, for example an endless belt 10, having an active rib which extends into the enclosure above the fluidized bed from the feed zone to the removal zone. This endless belt is drawn by a motor, not shown, which is adapted to cause the active rib of the belt to circulate from the feed zone toward the removal zone. A plurality of elements such as upright plates 11 are distributed along belt 10 so as to project from the belt and to plunge into the fluidized bed at the level of the active rib. These plates function so as to draw the grains along and to assure precise control of the processing time of the grains in the enclosure.

Enclosure 1 has an air inlet 12 coupled at its base and a discharge conduit 13 at the top which is prolonged by a recycling conduit which is provided with a blower 14 and feeds back to inlet conduit 12. A drawing off tap 15 with a vane is connected with discharge conduit 13 to permit removal of a small part of the recycled gas at the end of its purification. Also, an air aspiration conduit 16 with a non-return valve allows introduction of air into the circuit to compensate the losses through tap 15, hopper 8 and the removal conduit 9.

The power of blower 14 is adjusted so that the velocity of air circulation in enclosure 1 is greater than minimum fluidized velocity for the fine particles of the auxiliary body. Considering the small granulometry of these particles, this velocity is low and allows for an enclosure of elongated section of large dimensions, while retaining gas flows of reduced values and limited energy consumption to assure circulation of the air.

As will be seen by the description of a particular example of the treatment, the quality of heat exchanges between the fine particle bed of the auxiliary body and the grains to be roasted considerably reduces the necessary processing time of the grains in the enclosure in relation to known processes and allows for a very favorable heat balance. In these conditions, there is little loss of heat, and the heat application necessary at any instant can be supplied to the particles of the fluidized bed from an expensive but clean energy source, such as electric heating elements 3, which allows recycling of the gases. On the contrary, in known processes, the gases heated by a liquid fuel burner, because of the large quantities of heat required, are contaminated by the fuel gases and by the burned fuel residues, and cannot be recycled, which poses problems of pollution of the air.

It is to be noted that the quality of roasted products is clearly improved in the process according to the invention for several reasons. The recycling of the carrier gas creates concentration of the aromas, which can be maintained by these compounds in the grains themselves. Besides, the intensity of the heat exchanges and the excellent control of temperature of the fluidized bed allows for uniform and in-depth treatment of the grains.

The continuous process allows for great flexibility; it can be easily automated, and the roasting time, the gas flows, the solid flows and the heating power can be varied in each application.

One inconvenience of the process, greatly conpensated by the above advantages, resides in the risk of mixing a small quantity of fine particles of the auxiliary body with the grains of the treated product of relatively selected granulometry and structure. A separation operation can then follow the treatment. This operation is facilitated by the difference of granulometry and density of the products and can be coupled with a hardening operation of the roasted product. It is to be noted that the fine particles once collected can be reintroduced into enclosure 1, either with the product to be treated or through a special conduit.

In the case of coffee, it is established that the particles of the auxiliary product succeed in penetrating into the medium furrows of the coffee grains during roasting when their diameter is small and are then trapped therein when the grain contracts during cooling. Tests have shown that fine particle content percentage by weight, zero when glass balls of 1200 microns are used, is on the order of 0.8% when particles of approximately 850 microns are used, and is 2 to 3% with glass balls of 250 microns. A final separation operation is thus desirable. This can be carried out by roughly molding the grains in such a fashion as to liberate the fine particles by effecting the separation based on the differences of diameter or density of the products. This is not absolutely required in practice because the coffee is in large proportion, delivered to the market in molded or soluble form.

As an illustrative example, the following table furnishes the essential features of the roasting tests realized by means of pilot installation of the type described. The height of the fluidized bed corresponds to approximately 4.5 times the means granulometry of the grains and the relationship of the volume masses of the fluidized bed and the green grains, as in initial state, is equal to approximately 1.85, which represents optimum conditions for carrying out this process.

| | |
|---|---|
| Enclosure characteristics | Length: 40 cm<br>Width: 8 cm<br>Height: 20 cm |
| Characteristics of the fluidized bed | Kind of auxiliary body: glass<br>Particle diameter: 250 microns<br>Volume mass: 2.61 grs/cm$^3$<br>Weight of fine particles contained in enclosure:<br>1250 grams<br>Height of the fluidized bed before introduction of the coffee: 30 mm<br>Air flow: 37 normal m$^3$/h.<br>Temperature of the fluidized bed regulated to 250° C.<br>Apparent mean volume mass of the bed: 1.3 gr/cm$^3$ |
| Characteristics of the product to be treated | Coffee grains  Cameroon Robust<br>           Costa Rica Arabic<br>Mean granulometry of green grains: 6 to 7 mm<br>Volume mass of grain before treatment (green grains):<br>0.7 gr/cm$^3$<br>Volume mass of grain after treatment (roasted grains):<br>0.39 gr/cm$^3$ |
| Operating conditions and results | Coffee weight in the course of treatment within enclosure:<br>300 grams<br>Time of appearance of first cracking: 20 seconds<br>Roasting time: 150 seconds<br>Percentage by weight of particles of auxiliary body collected with the grains at end of treatment:<br>2.5% |

It is established that the roasting time is very short; this time is between 9 minutes in the traditional processes using 260° C. hot gas.

In taste tests performed by the French Coffee and Cocoa Institute (I.F.C.C.), the products obtained showed remarkable organoleptic qualities.

Series of tests in which the parameters were varied established that good roasting is obtained when the temperature of the fluidized bed is between 230° and 280° C., and the coffee grains remain in this bed for from 120 to 200 seconds.

It has been established that a slight increase of the temperature of the fluidized bed in the above conditions has little effect on the time required for treatment, while a greater increase of the temperature beyond the top limit of this range seems prejudicial to the quality of the product; and below 230° C., there is great difficulty effecting the roasting.

When the operating conditions are such that the weight of the coffee contained at any instant in the enclosure becomes greater than approximately 25% of the weight of the fine particles of the auxiliary body, the conditions for sustaining the grains in the fluidized bed deteriorate rapidly. In practice, the operating conditions for roasting, i.e. coffee feed, drawing through, removal, remain at any time lower than approximately 25% of the weight of the fine particles.

Moreover, the selection of air flow equal to 37 normal m$^3$/h allows an air passage velocity on the order of 3 times the minimum velocity of fluidization of the fine particles of the auxiliary body, and assures a good compromise, permitting operation with small air flow while obtaining optimum conditions for mixture of the fine particles and grains.

The percentage by weight of grains in relation to the fine particles and the gas velocity are not at all limited and can be varied with the geometric and physical characteristics of the fine particles which are used.

It is also to be noted that in molding the roasted coffee grains to a granulometry of approximately 500 microns, a perfect separation is effect in the fluidized bed of the fine particles which are collected with the grains because of the differences of granulometry and density of the particles.

We claim:

1. A process for roasting grains of an agro-food product of a type such as will swell and lose weight during heat treatment comprising:

placing chemically inert particles in fluid suspension in an enclosure by means of a flowing carrier gas having a velocity greater than the minimum fluidization velocity of said particles so as to form a fluidized bed of said particles, said bed having a thickness of at most about 30 times the mean diameter of said grains and an apparent mean volume mass of about 1.2 to 4 times the initial volume of the grains to be roasted, bringing said bed to an elevated roasting temperature, introducing said grains into said bed so that said grains are in fluid suspension in said bed and allowing said grains to remain in said bed for a time sufficient to dry and to roast said grains, wherein during said drying and roasting the grains become lighter and rise to the top of the bed, and removing the roasted and dried grains from the top surface of said bed by overflow.

2. A process for roasting as in claim 1 and including adjusting the carrier gas flow so that the gas velocity in the enclosure is on the order of 3 times the minimum fluidization velocity of said particles.

3. A process for roasting as in claim 2, wherein said particles have a mean diameter at most equal to approximately 1/5 the mean diameter of the grains of the product to be roasted.

4. A process for roasting as in claim 3, wherein the product to be roasted is introduced into the enclosure so that the weight of the product contained in the enclosure at any time is at most equal to approximately 25% of the weight of said particles.

5. A process for roasting as in claim 1 and including subjecting said grains to rapid cooling or tempering at their discharge from the enclosure and separating said particles by causing said grains upon their discharge from the enclosure to circulate on a screen which has a mesh size between that of the fine particles and that of the grains of the product, and vibrating said screen and passing a current of cold gas upwardly therethrough.

6. A process for roasting as in claim 1 and including subjecting said grains upon discharge from the enclosure to a rapid cooling or tempering operation, coupled with separating said particles by fluidizing said grains in a cold gas current upon their discharge from the enclosure, so as to separate said particles from said grains by a shock effect and a pneumatic draft upon said grains.

7. A process for roasting as in claim 1 and wherein said carrier gas is an inert gas.

8. A process for roasting as in claim 1 and wherein said fluidized bed is brought to a temperature between 230° and 280° C., and the grains are left in said bed for between 120 and 220 seconds.

9. A process for roasting as in claim 8 and wherein some of said particles remain within the grains and coarsely molding said grains after roasting and subjecting said grains to a final separation operation for separating said fine particles.

10. A process for roasting as in claim 1 and including continuously introducing said grains into said enclosure and continuously removing said grains therefrom.

* * * * *